No. 709,239. Patented Sept. 16, 1902.
J. B. L. McKENZIE.
WATER GAGE CONNECTION.
(Application filed Feb. 6, 1902.)
(No Model.)
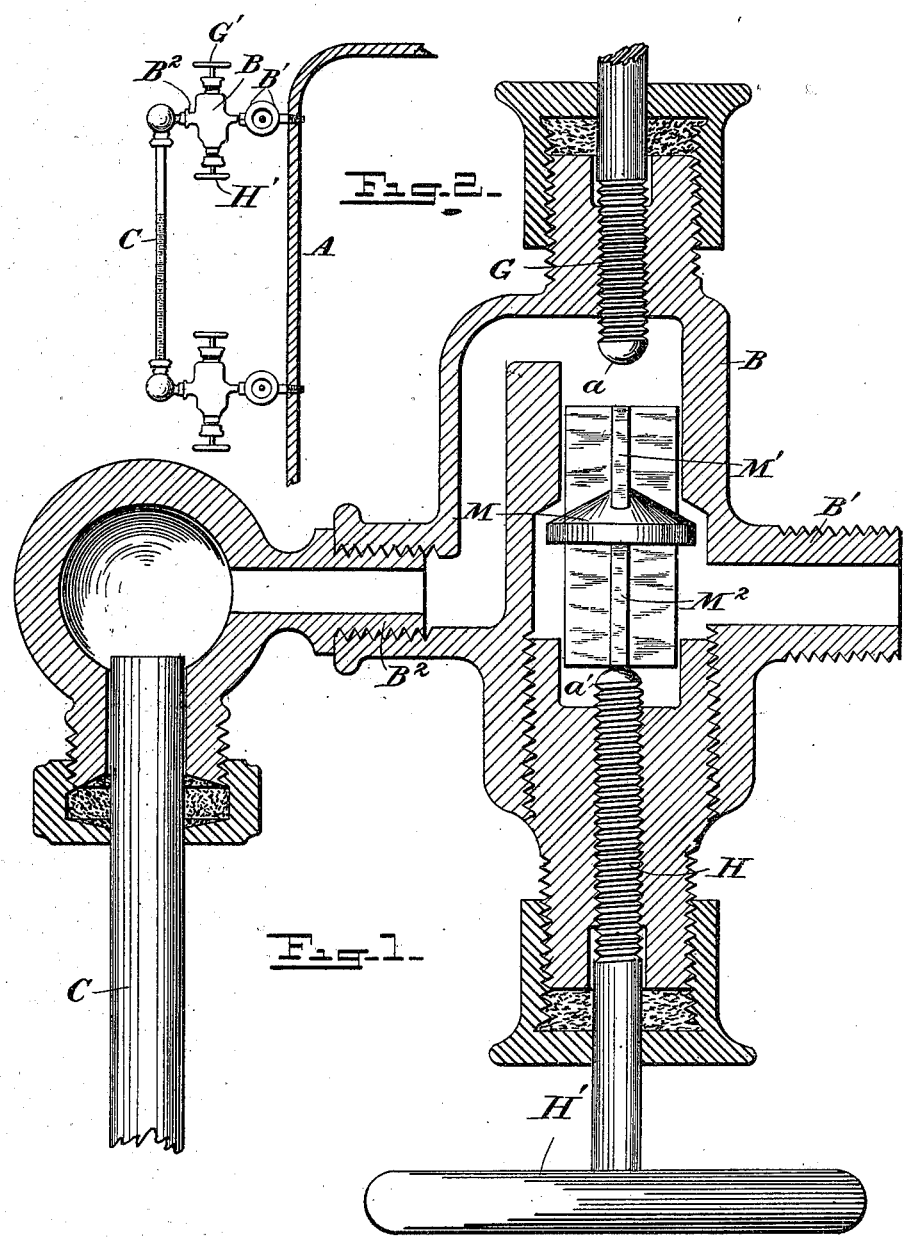
WITNESSES:
INVENTOR
BY
ATTORNEY

UNITED STATES PATENT OFFICE.

JOEL B. L. McKENZIE, OF RAHWAY, NEW JERSEY.

WATER-GAGE CONNECTION.

SPECIFICATION forming part of Letters Patent No. 709,239, dated September 16, 1902.

Application filed February 6, 1902. Serial No. 92,796. (No model.)

*To all whom it may concern:*

Be it known that I, JOEL B. L. McKENZIE, a citizen of the United States, residing at Rahway, in the county of Union, in the State of New Jersey, have invented a certain new and useful Improvement in Water-Gage Connections, of which the following is a specification.

The improvement applies to the connection of glass gage-tubes to the boiler at the upper and lower ends, respectively. I provide each with a self-acting valve which stands slightly open to allow sufficient flow of steam and water, respectively, while the gage is working, but will close with the strong flow when the glass gage-tube breaks. Such have been before made, but I have devised an important improvement in the arrangement of the passages and the provisions for guiding and for forcibly opening and closing when desired. I provide independent means for effecting each motion, so that an adjustment of one does not involve any disturbance of another.

The following is a description of what I consider the best means of carrying out the invention.

The accompanying drawings form a part of this specification.

Figure 1 is a central vertical section through a portion on a larger scale. Fig. 2 is a side elevation.

Similar letters of reference indicate corresponding parts in both the figures.

Referring to the figures, A is the boiler; B, the casting which forms the body of the device; B', the connection to the boiler; B², the connection to the glass gage C; a', the chamber below the valve-seat, and a the smaller chamber above it.

M is a conical valve opening downward.

M' represents guiding-wings above, and M² corresponding wings below, each fitted so as to be truly guided in the respective chamber a' or a. There is so much looseness in the fit of each set of wings in its respective chamber that the valve has liberty to move bodily in all directions to a small extent and also to incline a little, so as to adjust itself to its seat, but its guidance at the widely-separated points above and below insures against its ever tilting, so as to jam or bind.

G is a screw having a hand-wheel G', guarded by a stuffing-box set vertically in line with the valve and having its lower end rounded and applying against a plane surface at the top of the upper wings M'. A corresponding screw H, having a hand-wheel H', similarly equipped, acts against a corresponding plane surface on the lower end of the lower wings. When either is turned into bearing, it acts centrally and in no wise interferes with the liberty for the valve to move laterally. The steam circulates freely in the spaces between the wings, both below and above the effective portion of the valve. When the glass gage breaks, the upper chamber a is relieved from pressure and the whole force of the steam presses upward actively on the whole lower surface of the valve and lifts the truly-ground valve into tight contact with its seat. The freedom for self-adjustment allows it to shut tightly. The same result follows if the screw H is turned to force it up tightly to its seat. It may be well in any repairs to turn the screw H, and thus tightly insure the holding of the valve up; but the pressure of the steam will do this with tolerable certainty if relied on alone. When the new glass tube has been supplied or any other required repairs, as a readjustment of the packing around such tube, have been completed, the screw H must be lowered; but it should be lowered only a little. Next the screw G is turned downward to act on the valve and force it a little open. After the steam has passed the valve and properly filled the glass tube the lower valve, which also opens downward, being similarly manipulated, the screw G in each connection should be raised again, and the gage is then ready to serve reliably and so conditioned that the valve in each connection is certain to close the instant the new glass tube breaks, and so on indefinitely.

My construction, by causing the steam in the upper connection and water in the lower connection to act directly and freely on the lower surface of the respective valve, flowing freely between the lower wings and acting with full force on the bottom of those wings except the almost inappreciable space underlaid by the contact-point of the rounded screw, acts with a promptness and efficiency not attainable by any other construction known to me. The wings M' above and the wings M² below insure an efficient guidance with a sufficient looseness of fit to allow the contact-surfaces to freely and certainly find their seats. When one part is required to perform more than one function, a change to promote one is liable to derange another. In my valve such is not required, as each screw acts independently.

Modifications may be made without departing from the principle or sacrificing the advantages of the invention. I can as a precautionary measure have a stop-cock in addition to the provisions for holding the valve tightly closed. Fig. 2 shows the invention thus carried out.

I have shown the connections for the glass tube as formed with a separate piece of metal. The metal parts for each end of the tube can be made all in one piece.

I claim as my invention—

In a safety connection for water-gage the closing-screw H and opening-screw G, arranged in a vertical line, and the vertically-moving valve M with its upper wings M' and lower wings M² loosely guided in the chambers $a$ and $a'$, arranged to be acted on by the contracted ends of such screws, all adapted to serve substantially as herein specified.

In testimony that I claim the invention above set forth I affix my signature in presence of two witnesses.

JOEL B. L. McKENZIE.

Witnesses:
J. B. CLAUTICE,
M. F. BOYLE.